Jan. 2, 1940.  E. R. BURTNETT  2,185,538
TRANSMISSION MECHANISM
Filed Aug. 6, 1937  3 Sheets-Sheet 1

INVENTOR.
Everett R. Burtnett

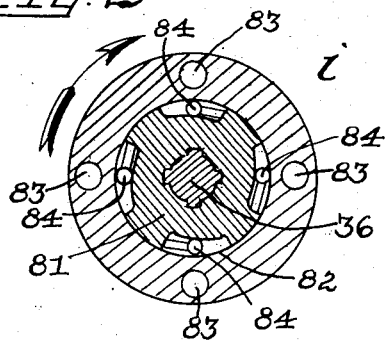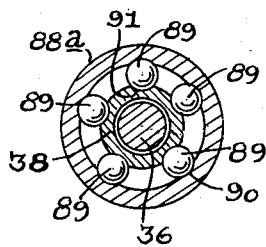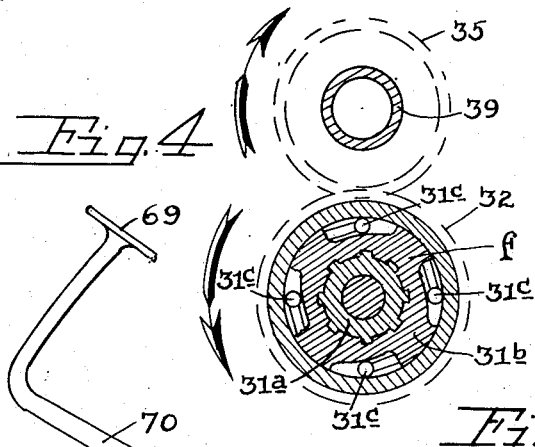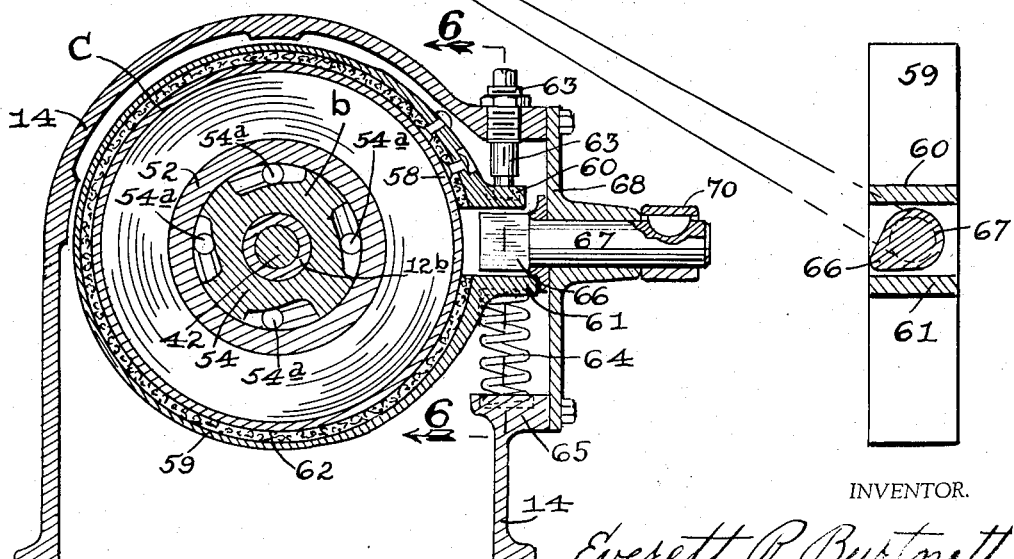

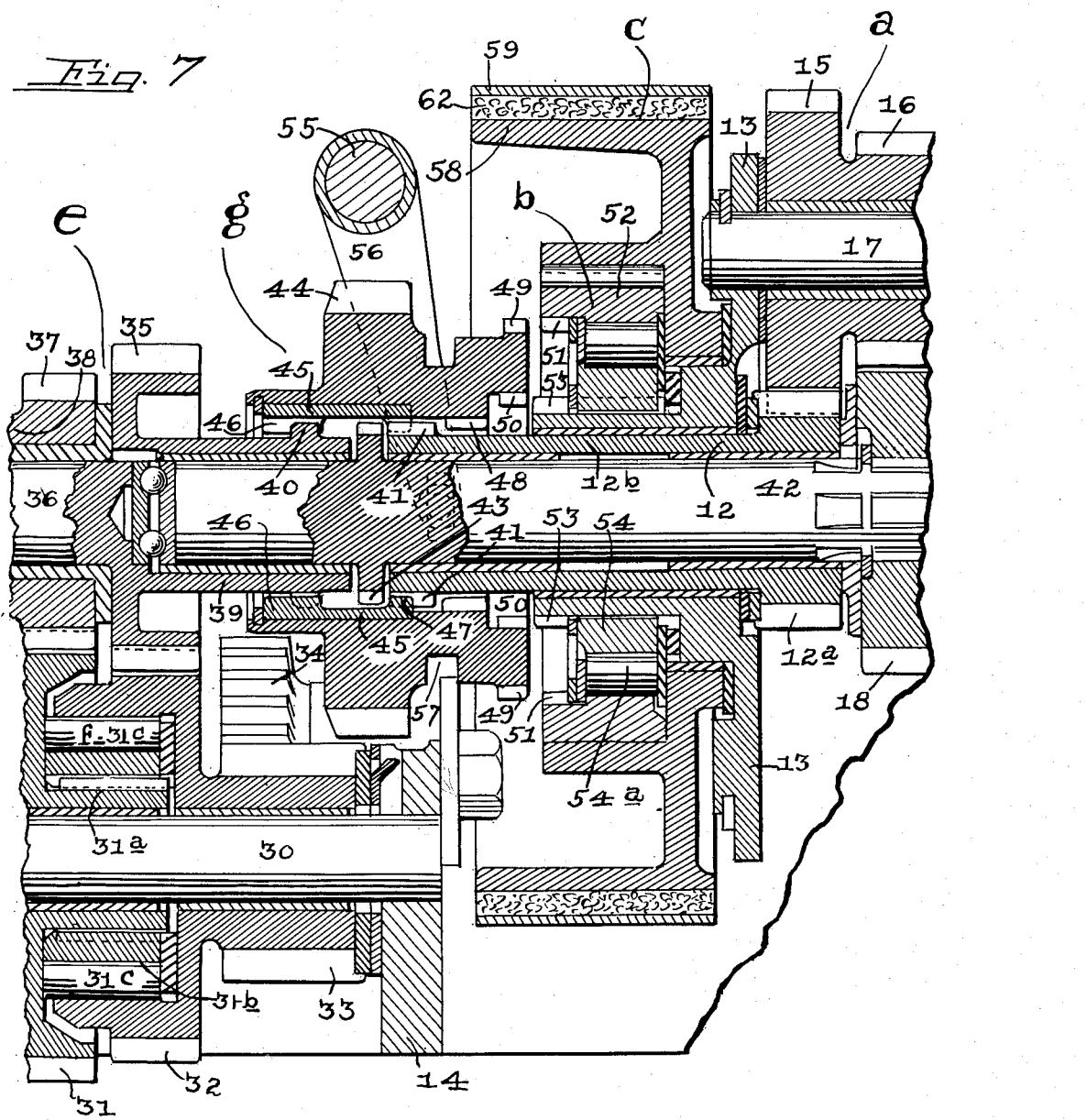

Patented Jan. 2, 1940

2,185,538

UNITED STATES PATENT OFFICE 2,185,538

TRANSMISSION MECHANISM

Everett R. Burtnett, Los Angeles, Calif., assignor to Automotive Improvement Patents Corporation, Los Angeles, Calif.

Application August 6, 1937, Serial No. 157,751

16 Claims. (Cl. 74—260)

This invention relates to automatic transmissions and particularly to automatically variable change speed power transmitting mechanisms adapted for use in motor vehicles.

The invention contemplates the provision of a change speed power transmitting mechanism having means for automatically disconnecting the engine from the load and connecting the engine to take the load responsive to speed of the driving member to the change speed gearing, preferably the engine, and respectively, disconnecting the engine from the load upon the engine operating below a predetermined speed of rotation, and connecting the engine to take the load upon the engine being operated above said predetermined speed; and having means responsive to certain conditions of operation of the vehicle for changing the gear ratio of drive.

The invention further contemplates the provision of an automatic change speed transmission, having a first centrifugal clutch for normally automatically disconnecting the engine from, and for normally automatically connecting the engine to take, the load, with a normally disengaged auxiliary clutch mechanism engageably under control of the driver for optionally counteracting or rendering of the engine connecting centrifugal automatic clutch inoperative and by which the engine may be alternately connected to take the load with a consequent change in the speed ratio of drive over that which would normally be effected by the engine connecting centrifugal clutch.

In connection with this combine of centrifugal automatic and driver-controlled counteracting clutch provision, the invention further contemplates the provision of a one-way drive or overrunning gear train to be driven by the driver controlled auxiliary clutch whereby the driven element of said auxiliary clutch is facilitated to normally stand still to afford that same may be utilized as a contributory element to a vehicle 'no-back' provision in the present improved automatic transmission.

With respect to the last-mentioned objective, the invention further contemplates the provision of a stationary frictionally-engageable element adapted to be normally engaged by the normally overrunning driven element of the auxiliary clutch.

The invention further contemplates the provision of an automatic transmission having a multi-speed planetary gear unit adapted, as customary, to gear drive operation when the pivotal element thereof is restrained from rotating backwards, provided with the usual overrunning clutch to contribute to restraining the pivotal element from rotating backwards, but also provided with a normally applied but optionally releasable friction brake means for completing the no-back function of the overrunning clutch to the planetary gear unit pivotal element, whereby the planetary gear unit may be optionally rendered incapable of driving by releasing the friction brake auxiliary to this overrunning clutch. This novel provision of an optionally releasable friction brake adjunct to the planetary gear unit no-back functioning overrunning clutch has as an object, the retaining of the conventional clutch pedal, but novelly placed in connection with, and to be actuated to release, the combined overrunning clutch and friction brake no-back to the planetary gear unit, by which the driver may, by conventionally depressing the clutch pedal when the vehicle is standing and in gear, cause the transmission to open to a neutral state regardless of engagement of either the engine speed responsive centrifugal clutch or the counteractive auxiliary clutch thereto. This provision is considered highly advantageous particularly in that it obviates the principal drawback standing in the way of obtaining the advantages of a centrifugal automatic input-to-gearset clutch.

A further object for providing the normally stationary frictionally locked auxiliary clutch and clutch pedal releasable no-back-to-planetary gear unit brake innovations, is to provide an automatic 'no-back' against the vehicle rolling backwards while the transmission is selected in 'forward gear', and such a 'no-back' as may be easily released under any conditions, either to allow the vehicle to roll backwards while still in 'forward gear' or to facilitate easy shifting into 'reverse' from 'forward.'

The invention further contemplates the incorporation of a centrifugal automatic clutch means for locking the planetary gear unit of the present invention to rotate as a unit to give a direct drive through the planetary unit. However, in connection with the incorporated multi-speed planetary gear unit and associate centrifugal automatic clutch, the invention still further contemplates the provision of a simple forward and reverse drive selecting means having a single shiftable element. Such a single shiftable element as will effect a reverse drive connection when moved in one direction from one position in which the transmission is established completely in neutral to another position in which the transmission is established in reverse; and shiftable from said neutral position in the other direction progressively, first to a first other position in which the transmission is established in 'forward' for automatic change speed, and secondly to an extreme progressively moved position in which the transmission will be optionally established in a 'permanent positive' low gear ratio. In which positive gear the automatic change of speed can not take place but the engine is connected to operate on compression at a ratio effective as a brake against vehicle momentum. Objects of this single shiftable element means for altering the permanent preselections of the transmission for driving are simplicity of manufacture, its straight to and fro movement virtue and corresponding simple manual control actuation requirement, and the advantage of progressive shift from 'forward automatic change speed preselection' to 'optional' permanent (compression) low gear ratio drive selection.

A still further object of the invention, and more particularly in connection with the provision of the multi-speed planetary gear unit and its associate centrifugal automatic clutch, is the provision of novel means for obtaining reverse drive independently of, and as a direct by-pass through, the planetary gear unit, thus eliminating the need for ratchets or other complicated means usually provided to circumvent or alter the planetary gear unit for reverse drive.

Other objects and advantages will be apparent from the following specification taken in conjunction with the accompanying drawings and in which:

Fig. 2 is a vertical transverse sectional view taken on line 2—2 of Fig. 1. The direction of the view being indicated by the arrows.

Fig. 3 is a vertical transverse sectional view taken on line 3—3 of Fig. 1.

Fig. 4 is a vertical transverse sectional view taken on line 4—4 of Fig. 1. The direction of the view being indicated by the arrows.

Fig. 5 is a vertical transverse sectional view taken on line 5—5 of Fig. 1. The direction of the view being indicated by the arrows.

Fig. 6 is a vertical longitudinal sectional view taken on line 6—6 of Fig. 5. The direction of the view being indicated by the arrows.

Fig. 7 is an enlarged fragmentary vertical sectional view of the shift unit g.

Figure 1:
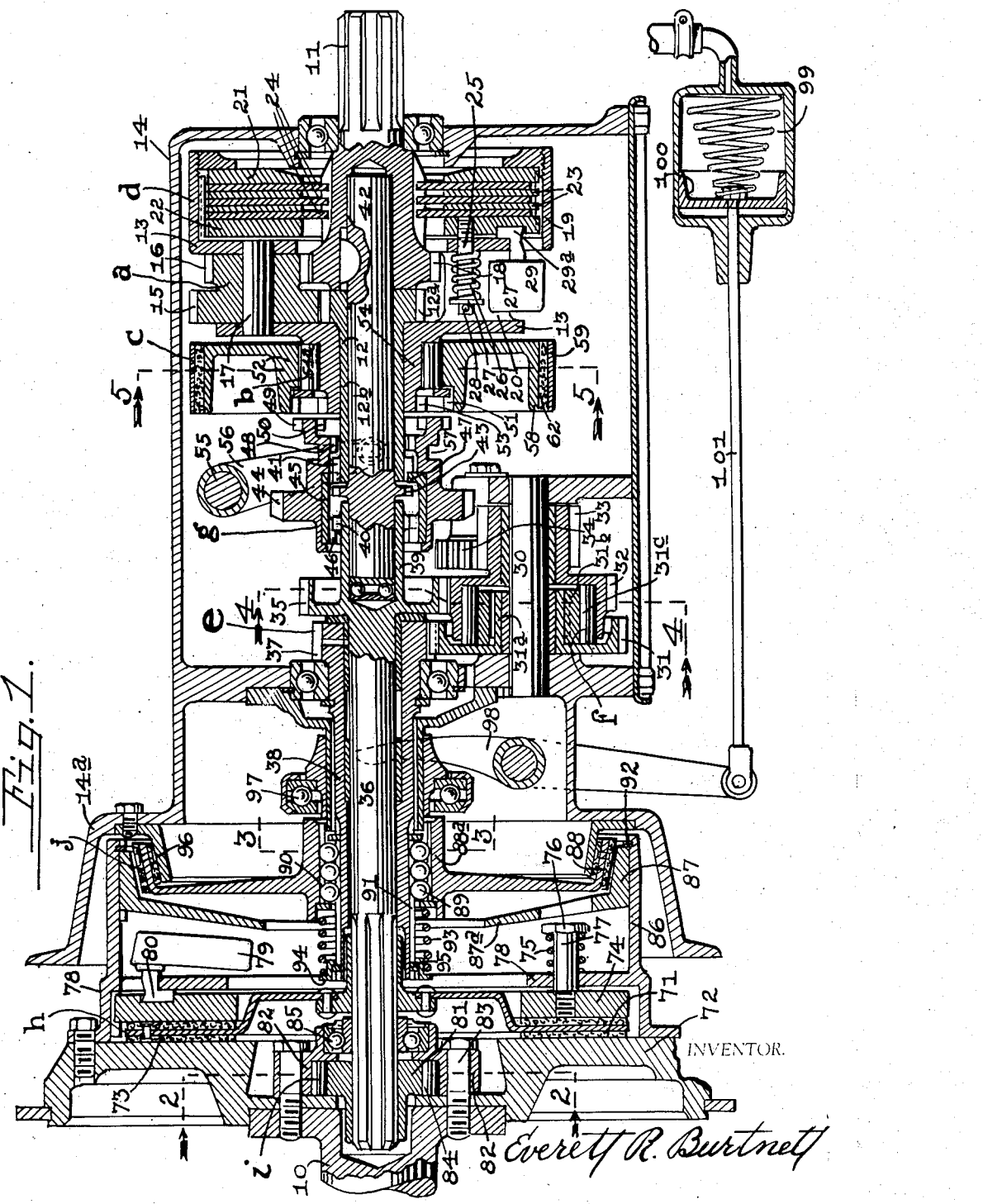
Fig. 1 is a central vertical sectional view of my novel form of change speed transmission mechanism.

Referring now to Fig. 1 of the drawings, there is shown a driving member 10 (usually the engine crankshaft). A driven member 11 (usually the vehicle propelling driven member). A multispeed planetary gear unit forming a secondary forward drive speed reducing train and indicated generally at a and arranged to drive the driven member 11 either at reduced speed or at the same speed as that of the driving member 12 to the planetary gear unit which latter in the present transmission form is shown to include a drive gear portion 12a having a forwardly extending sleeve shaft portion 12b. An overrunning clutch indicated generally at b is adapted to act as the primary no-back element to the pivotal element 13 of the planetary gear unit, and a friction brake generally indicated at c and adapted to augment the overrunning clutch b to rest against a stationary element forming the gearbox 14. Completing the planetary gear unit a are planet gear clusters comprising integral gears 15 and 16 mounted to rotate around their own axis on an arbor 17 secured to the pivotal element 13 and a driven gear 18 integral with the driven or tail shaft 11. With a load acting to restrain rotation of driven shaft 11 and a forward drive torque applied to drive gear 12a the tendency of the pivotal element 13 will be to rotate backward. The overrunning clutch b and the friction band brake element c operating to prevent backward rotation of pivotal element 13 causes the axis of the planet cluster gears 15 and 16 to remain fixed and the gears 15 and 16 themselves to rotate (anti-clockwise from the front) resulting in forward drive or clockwise rotation of the driven gear 18 and driven shaft 11 at reduced speed relative to the drive gear 12a. So that the planetary gear unit a will become locked to rotate as a unit and cause a direct drive between drive gear 12a and driven gear 18 to result in direct drive of shaft 11 upon a reversal of torque taking place through the planetary gearing, a centrifugal automatic clutch indicated generally at d is carried in rotation with the pivotal element 13. This centrifugal clutch d comprises a shell 19 preferably formed as an integral part of the pivotal element 13 which latter is joined with respect to parts on either side of the planetary gears by a bridge section 20, a bottom friction plate 21, to rotate with the pivotal element 13, a presser plate 22 also to rotate with the pivotal element 13, a plurality of driving disks 23 (preferably steel) also to rotate with the pivotal element 13, alternate driven disks 24 (preferably bronze) to rotate with the driven or tail shaft 11, means normally acting to yieldingly urge the presser plate 22 to declutchably move away from the clutch disks and into a retracted position of rest comprising bolts 25 threaded into apertures formed in the presser plate 22 and springs 26 compressed between a portion of the pivotal element 13 and washers 27 held in place over bolts 25 by means of pins 28, and centrifugal weights 29 having feet portion 29a wedged between the presser plate 22 and an adjacent portion of the pivotal element 13. The force of the centrifugal weights 29 is adapted to overcome the retractive influence of the springs 26 and result in the presser plate 22 being thrust toward the disks 23 and 24 whereby the clutch d is automatically engaged upon the pivotal element 13 rotating clockwise, as it is permitted to do by the overrunning clutch b under a reverse of torque such as will result from shaft 11 and driven gear 18 trying to drive the drive gear 12a through the planet cluster gears 16 and 15. It is obvious that the spring 26 and weight 29 coefficients could be predetermined so as not to cause the clutch d to become engaged, even under the torque-reversal principle of giving the centrifugal clutch rotation, until a desired corresponding vehicle speed had been attained. So that under that vehicle speed the change of speed ratio of drive which results from the engagement of the clutch d would not occur even though the engine was momentarily decelerated. Thus I have described the secondary speed reducing planetary gear train. The novel drive neutralizing releasable no-back provision and the centrifugal automatic direct drive connecting clutch components of my invention.

A primary speed reducing gearing is indicated generally at e and comprises a parallel countershaft arrangement comprising the usual fixed axis countershaft arbor 30, a driven gear 31 having a hub portion 31a mounted free to rotate on the arbor 30. A gear cluster comprising integral gears 32 and 33, the latter acting as a constant mesh pinion to a reverse idler gear 34. A normal drive gear 35 in constant mesh with gear 32 and forming an integral part of a normal clutch shaft 36. An auxiliary drive gear 37 in constant mesh with gear 31 and forming an integral part of an auxiliary clutch shaft 38. And an overrunning clutch indicated generally at *f* acting to one-way drive connect the gear 31 to drive the gear 32 and permit overrun of the latter gear, as will be coincident with connection of the normal clutch shaft 36 directly to the driving shaft 10. The overrunning clutch *f* comprises a cammed hub 31*b* splined to the hub portion 31*a* of the gear 31, roller clutch members 31*c* and the gear 32 forms the annulus.

Intermediary between the primary speed reducing gearing *e* and the secondary speed reducing (planetary) gearing *a* is a selective unit indicated generally at *g* and comprises a rearwardly extending shaft portion 39 of the clutch shaft 36 having clutch jaws 40 constituting a forward drive output from the primary gearing *e*. Corresponding clutch jaws 41 are formed on the sleeve shaft extension 12*b* of the planetary drive gear 12*a*. A forwardly extending shaft 42 which is fixed to the driven shaft 11, has clutch jaws 43 corresponding to jaws 40 and 41 and is pilot journalled in the extension 39 of the clutch shaft 36. A shiftable gear 44 encircling the clutch jawed portion of the shafts 39, 12*a* and 42 is provided with an internal jaw clutch member 45 having a first series of internal clutch jaws 46 at one end and a second series of internal clutch jaws 47 at the outer end. A first series of clutch jaws 48 and a second series of clutch jaws 49 and a third series of clutch jaws 50 are formed on the shift gear 44. The gear 44 itself is adapted to be brought into mesh with the reverse idler gear 34 to obtain reverse drive of the shift gear 44. Clutch jaws 51 corresponding to and engageable by the jaws 49 are formed on the annulus 52 of the overrunning clutch *b* and clutch jaws 53 corresponding to and engageable by the clutch jaws 50 are formed on the cammed hub 54 of the overrunning clutch *b* to the pivotal element 13. The overrunning clutch *b* being completed by clutch rollers 54*a* engaging both the cammed hub 54 and the annulus 52. A transverse shaft 55 passing through the upper central portion of the gearbox 14 carries a shifter crank 56 which in turn carries blocks (not shown) but received in the groove 57 in the shift gear 44. Any suitable means (not shown) may be provided to actuate the shifter shaft 55 from a hand lever conventionally located to the driver.

The friction brake *c* associated with the no-back overrunning clutch component *b* of the planetary gear unit is adapted to be normally applied. To this end (referring now to Figures 5 and 6) a brake drum 58 is provided integral with the overrunning clutch annulus 52. A brake band 59, having lips 60 and 61 and to which a suitable brake lining 62 is secured, surrounds the drum 58. An adjusting bolt 63 is adjustably threaded through an aperture in the gearbox 14 and abuts the upper lip 60 of the brake band 59 so as to fix the position of the latter. A spring 64 is compressed between the lower lip 61 of the brake band 59 and a shelf portion 65 formed in the wall of the gearbox 14. The action of the spring 64 toward the bolt 63 is to normally but yieldingly cause the band 59 to grip the drum 58, whereby the overrunning clutch *b* of the pivotal element 13 of the planetary gear unit *a* is provided with an optionally releasable stationary operating connection with the gearbox 14. To expand the brake band 59 to render the overrunning clutch *b* ineffective in its function as a no-back to the pivotal element of the planetary gear unit *a* whereby the latter may be rendered inoperative with respect to transmitting rotation as long as the centrifugal clutch *d* is not engaged, I provide a cam 66 formed as an integral end of a shaft 67 which is journaled for rock movement in a removable side plate 68 which is in turn secured to the gearbox 14. This cam (refer to Figs. 5 and 6) 66 is adapted to be rotated downward with resulting engagement with the lower lip 61 of the brake band 59, the springs 64 yielding and the consequent release of the band 59 from the drum 58. As shown in Fig. 6, the shaft 67 is adapted to be actuated by depressing the clutch pedal 69 and crank 70, which latter is directly connected to the cam shaft 67. In this adaptation the releasable planetary gear unit *a* operates as a substitute for the customary 'declutching position' found in conventional motor vehicle transmissions and also operates as a means for releasing the vehicle no-back ability of the present transmission.

A normally operative input centrifugal automatic clutch is indicated generally at *h* and comprises a bottom friction face 71 formed on the transmission side of the engine flywheel 72. A driven clutch disk 73 adjacent the flywheel 72 and carried in rotation with the inner clutch shaft 36. A presser plate 74 carried in rotation with the flywheel 71 and adapted to be moved toward the latter to clutch the disk 73 and in the opposite direction to release the latter. Retractive springs 75 are compressed between the head 76 of a bolt 77, which latter is threaded into the presser plate 74, and a fixed back plate or clutch cover 78 which is detachably secured to the flywheel 71. Centrifugal weights 79 having feet portions 80 are wedged between the presser and back plates 74 and 78. Normally the centrifugal clutch unit *h* responds to a predetermined speed of rotation of the engine (driving member) above which the force of the centrifugal weights 79 overcomes the tension of the springs 75 and operates to connect the shaft 36 to turn with the engine shaft 10.

To assure the engine or driving shaft 10 rotating up to the speed of the shaft 36 at all times, an overrunning clutch unit, indicated generally at *i*, is interposed between the clutch shaft 36 and the engine shaft 10. This overrunning clutch (as shown in section in Fig. 2) comprises a cammed hub 81 preferably splined to the clutch shaft 36, an annulus 82 included with the flywheel 71 embodiment as a detachable part secured by means of the customary bolts 83 to the engine shaft 10, and clutch rollers 84 engaging both the cam and annulus elements 81 and 82. This overrunning clutch permits the engine to rotate in its normal direction of rotation at a faster speed relative to the clutch shaft 36 but affords a connection for the clutch shaft 36 to drive the engine shaft 10 in the same direction at the speed of the clutch shaft 36. This feature, among other capabilities, enables the engine to be started by pushing the car, as is often required. The usual pilot bearing 85 is preferably mounted behind the overrunning clutch *i*.

An auxiliary input clutch unit is indicated generally at *j*. This clutch is adapted to be normally disengaged but to be optionally engageable at the will of the driver. It forms a means for optionally directly connecting the auxiliary shaft 38 to rotate with the assembly consisting of the flywheel 72 and engine shaft 10 and comprises a lateral extension 86 of the clutch cover 78. A driving clutch cone 87 is slidably mounted on and rotates with the clutch cover 78 and has an internal flange portion 87a. A driven mating clutch cone 88 is mounted longitudinally movable relative to but to rotate with the auxiliary clutch shaft 38 by means of a hub portion 88a and anti-friction bearing instrumentalities 89 fitted into corresponding longitudinal races 90 and 91, respectively. formed in the hub 88a and shaft 38.

A snap ring 92 prevents the driving cone 87 from retracting rearwardly toward the mating driven cone 88 far enough to normally touch the latter, and a retractive spring 93, compressed between the hub 88a and an end abutment 94, the latter held in place by a split ring 95, urges the driven cone 88 to normally seat, at its under side, upon a stationary mate cone 96 preferably forming a part detachably secured to the clutch bell-housing 14a. In this double acting form and in association with the stationary cone 96, the driven clutch element 88 of the auxiliary or optional speed change control clutch j also forms a brake, normally applied, preventing operation of the power transmitting train consisting of shaft 38 and mating gears 37 and 31. The overrunning clutch f allows for this standstill of this auxiliary input transmitting train. The primary object of this brake application to the clutch shaft 38 and gear train comprising gears 37 and 31, is to provide a 'no-back' device for the overrunning clutch unit f, which will normally operate to prevent backward rotation of the drive gear 12a of the planetary gear unit when the transmission is selected in 'forward.' The planetary driving gear 12a thus being restrained from rotating backward would cause the planetary carrier 13 to be urged to rotate backward under any tendency of the driven or propeller shaft 11 and driven gear 18 to rotate backward. The combination of the friction brake j, the auxiliary overrunning drive train comprising shaft 38 and gears 37 and 31 and overrunning clutch f and gears 32 and 35, and the overrunning clutch unit b and the normally engaged friction brake c, cooperating to operate as an 'antomatic no-back', releasable at any time under any conditions by slightly depressing the clutch pedal 69 results in the band 59 being actuated to release the drum 58 and in turn effect the release of the annulus 52 of the planetary overrunning clutch b and consequently free the vehicle to roll backward. The release feature of a no-back is also important to facilitate shifting of gears, the transmission no-back strain would otherwise render shifting almost, if not impossible.

To actuate the auxiliary clutch j out of its normally stationary-held position and into clutch engagement, I provide the usual throw-out bearing 97 and crank 98 for thrusting the bearing 97 forwardly. The bearing 97 is adapted to directly contact the hub 88a of the driven clutch cone element 88 and result in thrust of the latter into engagement with its mating driving cone 87. Since the driving cone 87 is a longitudinally free element, it will depend upon abutment with some other element in order to resist the thrust of its engagement with mating driven cone 88. So that the engagement of the auxiliary clutch j will cause the centrifugal clutch h to be rendered inoperative, I adapt the centrifugal weights 79 to operate in the stead of the usual clutch throw-out fingers which latter are conventionally directly contacted by the throwout bearing 97. I adapt the bottom friction driving clutch cone element 87 of the auxiliary or optional control clutch j to strike the high leverage effective inner ends of the centrifugal weights 79, whereby the centrifugal weights 79 are caused to rotate around their own axis slightly but sufficiently to release or prevent engagement of the automatic clutch h. The same outside imparted energy as will build up a sufficient clutching coefficient between the actuating cones 87 and 88 to transmit the power from the engine to the shaft 38, will supplant the drive from the engine to the shaft 36 through the automatic clutch h.

Since it is advantageous to utilize the retained conventional clutch pedal 69 to optionally open the planetary gear for temporarily disestablishing a preselectively mobilized driving connection through the transmission to facilitate optional racing of the engine while the vehicle is at a standstill, and for the purpose of optionally releasing the automatic 'no-back' feature of the present transmission, I propose a vacuum cylinder 99 equipped with the usual plunger 100 connected by a rod 101 to the crank 98, whereby the optional change speed control clutch j may be power actuated to engage. Any suitable valve means (not shown) could be provided through which the driver could optionally cause connection of the vacuum cylinder 99 with the engine inlet manifold (not shown). A preferable means would be a button (not shown) protruding through the toe board convenient for the driver to depress with the left foot. An advantage of a suitable power media under control of the driver for actuating the optional change speed control clutch j would appear when the lower speed ratio of drive, superimposed over the automatic change speed ratio established by the planetary gear unit, was required for any appreciable time.

*Operation* of my improved transmission follows:

*Forward and for automatic change of speed ratio.*—This is established by moving the shift gear 44 rearwardly from neutral into the positive position in which it is shown. The clutch jaws 46 and 47 of the rotatable free clutch member 45 are, respectively, engaged with clutch jaws 40 of the clutch or input shaft 36 and with the clutch jaws 41 of the planetary-gear-unit driving sleeve shaft 12b. This clutch coupling relation finds the gear 44 out of mesh with its associate reverse idler gear 34 and also finds the reverse drive completing clutch jaws 43 circumvented by the clutch 45. With the clutch jaws 40 and 46 and 41 and 47, respectively, engaged, the forward drive may be completed and the vehicle set into motion, under drive of the second speed ratio of the four forward speeds, by accelerating the engine. This resulting in the input centrifugal clutch h becoming engaged automatically in response to the increasing engine speed. The subsequent drive being through the main clutch shaft 36 directly to engaged input clutch jaws 40 and 46, clutch 45, engaged output clutch jaws 47 and 41, sleeve shaft 12b, and planetary gears 12a, 15, 16 and 18 to the tail shaft or driven member 11. The planetary gearing a responds under drive from sleeve shaft 12b to gear drive the driven shaft 11 by virtue of the overrun clutch b and brake band c operating to pre it 7.

backward rotation of the planet carrier 13. This speed reducing gear drive may be of such ratio as will provide sufficient torque multiplication to do all normal starting in this gear. Since the centrifugal clutch d depends upon a reverse of torque through the planetary gearing a to attain speed of its carrier pivotal element 13, this second speed gear may be sustained for accelerating or propelling under load up to any desired vehicle speed attainment, and caused to change to high by momentarily decelerating the engine or sufficiently to promote sufficient rotation of the pivotal element 13 and consequent automatic engagement of centrifugal clutch d, thus causing the planetary gear unit a to be locked to rotate as a unit. This gives a direct drive fourth speed through the transmission. Due to the centrifugal clutch d depending upon a reversal of torque to obtain rotation to engage, the retractive (disengaging) springs 26 may be of comparatively light tension, thus affording that the centrifugal weights 29 will hold the clutch d engaged and consequently the high gear normally maintained down to any desired vehicle deceleration point, say 10 M. P. H. Whereupon the planetary gear unit a will be automatically opened again and revert to take the load as a gear drive alternative to direct (high) drive.

*Optional change at comparatively high car speeds from automatic high (fourth) to third speed (low high) ratio.*—By actuating the auxiliary clutch j into engagement the centrifugal clutch h is forced out of engagement, by virtue of the driving (bottom) cone clutch element 87 of clutch j thrusting against and causing retraction of the centrifugal weights 79. This provides for cancelling the direct drive through main shaft 36 to the planetary gear unit a at any time and supplementively bringing the gear drive through gears 37 and 31, overrunning clutch f, and gears 32 and 35 into play to drive the main shaft 36 at reduced speed relative to the engine shaft 10. Accordingly, by causing the clutch throwout bearing 97 to be thrust forwardly, such as would take place should the driver cause a communication to be established between the vacuum cylinder 99 and the engine inlet manifold, this optional gear drive would be established. Being a distinct gear train, this optional or primary gear drive would operate augmentively to whatever ratio of drive to driven member 11 the planetary gear unit a was functioning to give at the time. Hence, while the vehicle was under way at any speed above the aforementioned 10 M. P. H. and the planetary gear unit a was locked under engagement of centrifugal clutch d giving a normal direct drive (high or fourth speed), the optional bringing of the gear unit e into play would give a third speed ratio through the transmission. This optional third gear, due to the overrunning clutch f, would not induce any shock if reverted to at high car speed, because the centrifugal clutch h would be opened and subsequently the engine would have to be accelerated to overcome the slight gear differential between the fourth and the third speeds in order to take the load. In this optional third speed however, notwithstanding the overrunning clutch f, the vehicle could only free-wheel through the one gear ratio step deceleration of the engine to the direct drive-to-engine coupling provided by the overrunning clutch i. Due to these characteristics, this optional 'low-high' (third speed) alternative from high-high (fourth speed) provision would prove a very useful, instantly establishable and advantageous superacceleration gear.

*Optional gear reduction augments automatic second speed reduction to obtain first speed (low gear).*—Desiring first speed or low gear operation the driver may decelerate the vehicle when in motion to a point below the 10 M. P. H. at which the centrifugal clutch d will automatically uncouple the planetary gear unit a to gear drive at second speed reducing ratio, and employ his optional control means 99, 100, 101, 98 and 97 to bring the auxiliary clutch j into engagement. This results in a compound speed reduction drive through the auxiliary clutch shaft 38, the first or primary distinct gear train comprising gears 37 and 31, overrunning clutch f, gears 32 and 35, jaw clutch 45 and its engaged jaws 40 and 46 and 47 and 41, sleeve shaft 12b and second distinct gear train comprising the planetary gears 12a, 15, 16 and 18 to the driven shaft 11. In view of the torque-reversal operating adaptation of the centrifugal clutch d means for locking the planetary gear unit a to direct drive, this optional first (low gear) ratio may be maintained to propel the load as long as the engine is not decelerated sufficiently to cause a reversal of torque.

*Torque reversal change from optional low gear to optional third* may be effected, while the auxiliary clutch j is maintained engaged, by momentarily decelerating the engine, with the result that the planetary gear unit a will lock to give a direct drive and the speed reduction drive by gear unit e will maintain. Thereby effecting a change from first to third speeds.

*Optional change from third speed to high (fourth) speeds* is effected, and may be accomplished under full torque if desired, that is without decelerating the engine, by the operator simply releasing his optional control means over the auxiliary clutch j. By which the latter will open and release the centrifugal clutch h to engage.

*To optionally start the vehicle in first (low gear)*, the driver exercises his optional control, to bring the auxiliary clutch j into engagement while he simultaneously accelerates the engine to take the load. In this state of drive establishment, the two distinct gear trains e and a will operate collectively to give first speed reduction drive to propel the vehicle, and will maintain said gear, either until the optional control auxiliary clutch j is released causing the gear train e to relinquish to the direct drive of centrifugal clutch h and main clutch shaft 36, leaving only the second speed reduction of gear unit a in play. Or until, with clutch j engagement maintained, the engine is temporarily decelerated and the gear train a changes by engagement of centrifugal clutch d to direct drive, leaving only the third speed reduction of gear unit e.

*Neutral.*—This is accomplished by moving the gear 44, from its position shown, one step forwardly. Whereby the gear 44 will not yet engage the reverse idler gear 34, but the clutch jaws 46 will pass forwardly out of engagement with clutch jaws 40, the clutch jaws 47 will pass forwardly out of engagement with clutch jaws 41, and the clutch jaws 47, while coming into engagement with clutch jaws 43, but having no connection to be driven, will establish the transmission free.

*Reverse.*—Progressive moving of the gear 44 forwardly from its neutral establishing position will bring the gear 44 into mesh with the reverse drive idler gear 34 and also the clutch jaws 48 which are integral with gear 44 into engagement with clutch jaws 43. Wherein, under either automatic engagement of clutch h giving a second speed reduction drive through shaft 36 and gears 35, 32, 33, reverse gear 34 and 44 to engaged clutch jaws 48 and 43. Or under optional engagement of clutch j giving a first (low) speed reduction drive through shaft 38 and gears 37 and 31, overrunning clutch f, gears 33, 34 and 44 to engaged clutch jaws 48 and 43, the driven shaft 11 is reverse driven through the driving medium of its extension shaft 42.

*Optional permanent positive gear* for utilizing the engine compression at an effective engine speed as a brake against momentum of the vehicle. This may be accomplished by decelerating the vehicle down to any point under which the centrifugal clutch d will open, and by shifting the gear 44 progressively rearwardly from its "forward automatic" establishing position shown. Said progressive rearward shifting of the drive selector gear member 44 brings clutch jaws 49 thereon into engagement with clutch jaws 51 on the annulus 52 of the overrunning clutch b and simultaneously brings the clutch jaws 50 on the shift gear 44 into engagement with the clutch jaws 53 on the hub 54 of the pivotal element 13 of the planetary gear unit a. Whereby, the pivotal element 13 is positively locked, through the medium of the otherwise idling coupling means shift gear 44, in restraint against rotating in either direction to its final brake element c. Which latter, being normally applied by springs 64, renders the planetary gear unit a permanently operative to gear drive in either direction. The gear ratio of the planetary gear unit a may be such as to provide ample engine compression brake effectiveness.

*Optional low speed driving gear-to-established permanent positive second gear.*—In the preselected "permanent positive gear" described in the preceding paragraph, the transmission may be altered to give a low speed ratio by the driver exercising his optional control to bring the auxiliary clutch j into engagement. Again augmenting the speed reduction of the gear unit a with the speed reduction of gear unit e.

*Automatic no-back.*—This is in effect whenever the transmission is selected in "forward" (gear 44 positioned as shown for example). It results from the novel combination provisions in the present invention: that any tendency of the driven shaft 11 to rotate backwards will cause impartation of the same tendency to the pivotal element 13 through gears 18, 16, 15 and an existing no-back restraint against gear 12a. Said no-back existing restraint on gear 12a being effected primarily by the underside friction cone facing of the auxiliary clutch j being normally held by spring 93 into engagement with the stationary mating cone 96 secured to the clutch bell housing 14a. The intermediary train consisting of the shaft 12b, engaged clutch jaws 41 and 47, engaged clutch jaws 46 and 40, the gears 35 and 32, the no-back locking virtue of the overrunning clutch f, the gears 31 and 37 and the auxiliary clutch shaft 38 to the driven element 88 of the stationary held auxiliary clutch j, operates to prevent backward rotation of the drive gear 12a of the planetary gear unit a. While the no-back lock of the overrunning clutch b operates to prevent backward rotation of the pivotal element 13. These two no-back agencies collectively operate to prevent the driven shaft 11 from rotating backward as long as the clutch 45 by its carrying shift gear 44 is positioned as shown.

*Optional no-back release.*—This is necessary in any application of a transmission coacting no-back in order that the vehicle may be allowed to roll backward at any instant at the will and option of the driver and to enable shifting out of forward and into reverse (to back the car) in the event that the car was at a standstill with a torque strain prevailing in the transmission train as the result of the no-back. In the present transmission invention a practical and fool proof means for optionally and very easily releasing the automatic no-back is provided through the medium of the conventional clutch pedal retention, and more particularly with my novel provision of a normally applied but optionally releasable friction brake unit c means for completing a stationary element connection with the pivotal element cooperating overrunning clutch b to the planetary gear unit a. And still more particularly in that the retained clutch pedal 69 is made cooperative with and to optionally open this friction brake unit c. Whereby the 'no-back' is released by opening the band 59 and allowing the pivotal element 13 to rotate backwards, which in turn permits the driven shaft 11 to rotate backwards as well as the vehicle to roll backwards.

Thus I have described the simple and effective automatic and releasable 'no-back' contribution of the present transmission invention.

*To park vehicle in gear against rearward motion.*—The transmission may be selected either in 'forward automatic', in 'permanent positive gear,' or in 'reverse.' In either of the forward selections, the 'no-back' operates to prevent the vehicle from rolling backward. And in the reverse selection, the overrunning clutch i will rest the load of the vehicle against the dead engine.

*To park vehicle in gear against forward motion.*—The transmission may be selected in 'permanent positive gear' in which the load of the vehicle will rest through the medium of overrunning clutch i against the dead engine.

*To start dead engine by pushing the vehicle.*—The transmission may be selected in 'forward positive gear' and the vehicle forced to move forwardly, whereby the shaft 36 will be gear driven correspondingly to forward engine rotation under which the overrunning clutch i will cause the engine shaft 10 to rotate in its normal operating direction. Or, the transmission may be selected in 'forward automatic' whereby the planet carrier 13 will be caused to rotate and the centrifugal clutch d to engage upon the vehicle attaining sufficient speed, and in turn the engine caused to be rotated in 'high gear ratio' (direct drive) through the medium of the overrunning clutch i. Or the transmission may be selected in 'reverse' and the vehicle moved 'rearwardly,' whereby the gear train comprising gears 44, 34, 33, 32 and 35 will drive the shaft 36 and cause the overrunning clutch i to rotate the engine shaft 10 in its normal operating direction.

It will be seen that the only times the overrunning clutch i will idle or run, will be while the engine is idling and the car standing still, or while the optional change speed auxiliary clutch j is engaged; that the only time the pair of gears 37 and 31 will turn will be while the auxiliary clutch j is engaged; and that the only time the planetary gears 12a, 15, 16 and 18 will operate will be while the automatic clutch d is open. In high gear therefore gear running is minimized to the idling of the two pairs 35 and 32 and 33 and 34. This is a reduction by one pair compared to the current manual shift three forward speed motor vehicle transmissions.

It will be understood that various modifications may be made within the scope of the appended claims, without departing from the spirit of the invention.

Thus it will be seen that I have provided a rugged, combined automatic and optional means change speed transmission; giving an unusually wide range of variable gear ratios and performance providing for automatic declutching and clutching, respectively, upon stopping the car and accelerating the engine; providing for optionally rendering pre-mobilized driving trains ineffectual to facilitate racing the engine while in gear without imparting motion to the vehicle; and providing an automatic 'no-back' also brought releasably under control of the driver. All of which aggregation of important provisions being so designed and correlated that the complete transmission is yet comparatively simple, easy to manufacture, readily assembled and of a character lending to hard usage with the minimum of servicing or attention required.

I claim:

1. In a power transmission, a driving member, a driven member, an automatic speed responsive clutch carried in rotation with said driving member, another clutch associated with said driving member constituting a spring means normally disengaged clutch for engagement at the will of the operator, means whereby actuation operable to disengage, or prevent engagement of, said automatic speed responsive clutch will accompany actuation of said other clutch towards being engaged, variable speed transmitting means between said driving and driven members for giving certain driving ratio therebetween under function of one and for giving certain other driving ratio therebetween under function of the other of said named clutches, and means for changing the driving ratio of said transmitting means over either of its driving ratios as established by either of said named clutches aforesaid associated with said driving member including an automatic speed responsive clutch mechanism operable upon a temporary reduction in the speed of the driving member relative to the driven member.

2. In a power transmission, in sub-combination, a driving member, a driven member, variable speed transmission mechanism between said members, three clutches associated with said driving member, one of said clutches being a centrifugally operable clutch responsive to the speed of said driving member and associated with certain of the driving ratios of said transmission mechanism, a second of said clutches being a spring means normally disengaged clutch associated with other of the driving ratios of said transmission mechanism and adapted to be actuated to engage solely at the option of the operator and interoperatively connected so as to cause disengagement, or prevent engagement of, said centrifugally operable clutch as an accompaniment of said actuated engagement of said second clutch, the third of said clutches being a one-way clutch in series with said transmission mechanism for completing driving connections of the latter to transmit rotation of one direction of said driven member to said driving member while both said first and said second clutches are disengaged.

3. In a power transmission, in sub-combination, a driving member, a driven member, automatically variable change speed transmission mechanism between said members including a first clutch mechanism automatically operable in response to variations in the speed of said driving member for completing driving connections of a low speed ratio of said transmission mechanism initially between said members when said driving member tends to rotate sufficiently faster than said driven member and further including automatically engageable supplemental clutch mechanism for engagement when said driven member has attained sufficient speed of rotation and for changing the driving ratio between said members from low to a faster speed, and a one-way clutch for operation jointly with an engaged state of said supplemental clutch mechanism for rendering said transmission mechanism operable to drive said driving member from said driven member in one direction in the absence of sufficient speed of said driving member to induce engagement of said first automatically operable clutch mechanism.

4. In a power transmission, in sub-combination, a driving member, a driven member, a low speed transmitting train for driving said driven member from said driving member, a faster speed transmitting train for driving said driven member from said driving member, a one-way clutch in series in said low speed train for overrunning should both named trains be connected with said driving member at a time and for one-way drive function in said low speed train whereby the speed of the driving member must be raised to the ratio of said low speed train following a driving function through said faster speed train before any confliction between a partially disestablished driving connection through said faster speed train and a partial establishment of driving connection through said low speed train, respectively, between said driving and driven members could occur, said faster speed train for normal operation and said low speed train solely for optional operation, an automatically engageable clutch mechanism for drivingly connecting said driving and driven members through said faster speed train, an automatically normally but yieldingly disengaged clutch mechanism for employment at the will of the operator for drivingly connecting said driving and driven members through said low speed train, means whereby the operator may exercise his will to obtain engagement of the respective named clutch aforesaid for drivingly connecting said members through said slow speed train, and means whereby disengagement, or prevention of engagement of, said automatically engageable clutch will accompany actuation at the will of the operator of said low speed connecting clutch.

5. In a power transmission mechanism, in sub-combination, a driving member, a driven member, a free-wheeling low speed transmitting train between said members including an overrunning clutch in series therein, said low speed train solely for optional use, a high speed transmitting train between said members for the normal drive function therebetween and for automatic establishment including a separate clutch mechanism having automatically operable means for engaging same and for drivingly establishing said high speed train drive functional between said members and a separate clutch mechanism for establishing said low speed train drive functional between said members, said low speed establishing clutch having means for automatically disengaging same and means for actuating same into engagement at the will of the operator and said low speed establishing clutch forming means operable to cause disengagement, or an inoperable state to prevail in, said high speed establishing clutch as an accompaniment of actuation of said low speed clutch towards and into engagement.

6. In a power transmission mechanism, in sub-combination, a driving member, a driven member, a high speed transmitting train between said members, a low speed transmitting train between said members, an overrunning clutch in series in said low speed train whereby said train is implemented to rotate said driven member in one direction from said driving member and whereby said high speed train is adapted to be drivingly established between said members while the driving connections of said low speed train remain mobilized therebetween, a speed responsive automatic clutch mechanism for establishing said high speed train drivingly between said members, and a clutch mechanism for normal disengagement incidental to the normal operation of said high speed establishing clutch and for engagement solely at the option of the operator forming means for establishing said low speed train drivingly between said members in substitution for operation therebetween by said high speed train, said low speed establishing clutch forming means operable to render said high speed establishing clutch inoperative as an accompaniment of said low speed establishing clutch being actuated towards and into engagement.

7. In a power transmission, in sub-combination, a planetary gear unit having two relatively rotatable concentric elements, a coaxial revolvable member, a reverse drive member, a shiftable main clutch member in conjugation with establishment of the transmission for forward drive adapted to occupy a neutral position, a sub-clutch member carried shiftably with said main clutch member but for rotation relative to the latter, in said neutral position of said main clutch member said sub-clutch member adapted to couple said revolvable member and one of said two elements of the planetary gear unit together, said clutch members adapted to be shifted out of said one position and into another position, in said other position said main clutch member adapted to operatively connect said reverse drive member with one of said two elements of the planetary gear unit, and in the same said other position said sub-clutch member adapted to have uncoupled said revolvable member from the aforesaid one of the said two elements of the planetary gear unit.

8. In a power transmission mechanism which includes a driving member and a driven member and an automatically establishable transmission train between said members including a planetary gear unit in series in said train to render a drive contributing gear function therein and further including a clutch mechanism automatically operable in response to variations in the speed of the driving member for completing the driving connections of said train drivingly to propel said driven member from said driving member when said driving member is rotated at sufficient speed providing said planetary gear unit is established for gear drive function; brake means operable on the pivotal element of said planetary gear unit for rendering same gear drive functional whereby said train may be drivingly completed to propel said driven member from said driving member upon said clutch operating in response to sufficient speed of said driving member, said brake means including a system of engageable and disengageable friction elements provided with means normally but yieldingly engaging same whereby said brake is normally operative on the pivotal element of the planetary gear unit, said friction system of said brake means forming an optionally disengageable friction system adapted to be actuated out of engagement at the will of the operator to flexibly render the planetary gear unit neutral and in turn the transmission train between said driving and driven members neutral over the operations of said clutch aforesaid automatically operable in response to variations in the speed of the driving member, and means actuable at the will of the operator for actuating said friction system of said brake means out of engagement.

9. The mechanism described in claim 8, wherein said brake mechanism comprises a one-way stop brake operatively arranged in tandem with said friction system of said brake means and whereby the brake means is normally one-way stop operable only and permitting the pivotal element of its associate planetary gear unit to rotate in the other direction under torque reversal.

10. In a motor vehicle drive, in sub-combination with the vehicle engine flywheel and with a driven transmission member for propelling the vehicle and with a variable speed transmission mechanism between said flywheel and driven member; of a planetary gear unit complementary of said transmission mechanism for the latter to give a gear ratio drive from said driving member to said driven member, said gear unit including a pivotal element adapted to be restrained from retrograde rotation under forward rotative efforts as of said drive from said driving member whereby said transmission mechanism may function to propel said driven member under said drive from said driving member, means automatically operable in response to variations in the speed of said driving member for connecting the latter to drive said transmission mechanism when said driving member is rotated at sufficient speed and whereby, providing said pivotal element is restrained from said retrograde rotation, said transmission mechanism may rotate said driven member under drive of said automatically operable means connecting said transmission mechanism to be driven from said driving member, and brake mechanism for restraining said pivotal element from exercising said retrograde rotation including a system of frictionally engageable brake elements provided with means for normally but yieldingly energizing their engagement and with means whereby the operator may cause same to be actuated out of engagement at will, said friction system of said brake mechanism adapted to substitute in disengageability at the will of the operator thereby to temporarily render the transmission neutral in the stead of the customary normally spring means engaged friction clutch usually associated with the engine flywheel for operator-exercised optional-disengagement and for temporarily rendering the transmission neutral, at the flywheel.

11. In a power transmission mechanism, in sub-combination, a driving member, an axially aligned driven shaft extending into close proximity to said driving member, an establishable and disestablishable reversing gear train adapted to be driven from said driving member and including a driven gear element disposed for direct coupling to the portion of said driven shaft that is in said close proximity to said driving member, an automatically variable change speed transmission mechanism disposed for operatively circumventing the portion of said driven shaft that extends into said close proximity with said driving member, said automatically variable change speed transmission mechanism including a driven member for rotation at different of the automatically variable change speed ratios and positioned to input said rotations to an intermediate point of said driven shaft, and means including shiftable jaw clutch mechanism forming clutch means both between said driven gear element of said reversing gear train and said close-proximity extending-portion of said driven shaft and between said driving member and said automatically variable change speed transmission mechanism and therebetween for selectively coupling, either said automatically variable change speed transmission means to be directly driven from said driving member while disconnecting said driven shaft from any operative connection with said reversing gear train or said driven shaft to be directly driven from said reversing gear train while disconnecting said automatically variable change speed transmission mechanism from any driving connection from said driving member by which it might function as an intermediary to said driven shaft.

12. In a power transmission mechanism, in combination with a driving member and a driven member and a low speed transmitting train between said members including a one-way clutch mechanism in series in said train and means for establishing a faster driving connection between said members including an automatic speed responsive clutch mechanism for establishing said faster driving connection operable upon a temporary reduction in the speed of the driving member relative to the driven member; of an automatic speed responsive clutch mechanism carried by said driving member and upon whose clutch function said faster driving connection establishing clutch is in dependency for a full complement of driving connections between said driving and driven member, another clutch mechanism having an element adapted to occupy either of two positions one whereby said other clutch is inoperative with respect to association with said low speed train and the other whereby said other clutch would be operative with respect to association with said slow speed train, upon being moved into one of said two positions said element of said other clutch forming means operable to disestablish the clutchability of one of said automatic speed responsive clutch mechanisms, and means for actuating said other clutch mechanism whereby said element thereof may occupy either of said two positions.

13. In a power transmission, the combination of a driving member, a driven member, automatically variable change speed transmission mechanism for normally changing the gear ratio between said driving and driven members from a given driving speed ratio to a given relatively faster driving speed ratio and including sub-transmission mechanism whose driving connections are adapted to be mobilized incidental to an operable state of either the given or the relatively faster driving speed ratio means of said automatically variable change speed transmission mechanism and drivingly associated therewith such that said mobilized driving connections form means for optional employment and whose driving connections are operable to change either of the named automatically variable change speed driving speed ratios to a sub-lower driving speed ratio, respectively, between said driving and driven members, said automatically variable change speed transmission mechanism and said sub-transmission mechanism each having a separately engageable clutch mechanism, of said automatically variable change speed transmission mechanism, said separately engageable clutch mechanism constituting an automatically engageable clutch associated with establishing either of said named given or relatively faster speed driving ratios, of said sub-transmission mechanism, said separately engageable clutch constituting a clutch for engagement or disengagement solely at the option of the operator, means interoperatively connecting said named clutches, respectively, of said automatically variable change speed transmission mechanism and of said sub-transmission mechanism whereby actuation of the clutch of said sub-transmission mechanism towards and into engagement will render the clutch of said automatically variable change speed transmission mechanism incapable of completing its normally operable driving connection function, means under control of the operator for either causing engagement or disengagement of the clutch of said sub-transmission mechanism, said clutch of said sub-transmission mechanism forming means when engaged for establishing said sub-transmission mechanism operative as said optional driving connections in conjunction with the driving connections afforded by said automatically variable change speed transmission mechanism, and automatically operable means including still another and automatically engageable clutch mechanism for changing the driving speed ratio between said members when certain conditions have been attained in the mechanism from either a driving speed ratio as established by operation of said first named automatically engageable clutch or from a driving speed ratio as established by the engagement of said clutch of said sub-transmission mechanism.

14. In a power transmission mechanism, in sub-combination with a driving member, a driven member and automatically variable change speed transmission mechanism for changing the gear ratio between said driving and driven members from one to a relatively faster speed including an automatic speed responsive clutch mechanism for establishing said faster speed ratio operable upon a temporary reduction in the speed of the driving member relative to the driven member; of transmission mechanism adapted operable supplemental to that of said automatically variable change speed transmission mechanism therewith to change either said one or said relatively faster speed ratio between said driving and driven members, respectively, to a relatively lower speed ratio; and means including a normally but yieldingly disengaged friction clutch mechanism associated with said supplemental transmission mechanism and adapted to be actuated to engage solely at the option of the operator and whereby, brought into engagement, said optionally employable clutch will cause sufficient of the driving connections functions of said automatically variable change speed transmission mechanism to be overruled and the relatively lower speed driving connection function by said supplemental transmission mechanism to be substituted therefor.

15. In a power transmitting mechanism which includes driving and driven members and variable speed transmission means between said members, the combination, of a pair of concentric intermediate shafts in axial alignment with said driving member; a gear train operatively connecting said pair of shafts; an automatically operable first clutch mechanism for coupling one of said pair of shafts to said driving member; a normally disengaged second clutch mechanism engageably under control of the operator for coupling the other of said pair of shafts to said driving member; means rendering said second clutch mechanism operable to effect disengagement of said first clutch in the process of said second clutch being actuated into engagement; an overrunning clutch between, the respective shaft aforesaid as being connectable to said driving member by said automatically operable clutch, and said driving member whereby said driving member may be driven in one direction from said respective shaft while said automatically operable said first clutch is inoperative; and an overrunning clutch in series in said gear train whereby the respective of said pair of shafts driven by said second clutch mechanism may overrun the driving connection of its respective said second clutch effected connection with said driving member.

16. In a power transmission, the combination of a drive member, a driven member, automatically variable change speed transmission mechanism for changing the gear ratio between said drive and driven members at least from a given to a relatively faster speed including an automatic speed responsive clutch for establishing said faster speed ratio operable upon a temporary reduction in the speed of the drive member relative to the driven member, and means including an overrunning clutch for operation in conjunction with an engaged state of said automatic speed responsive clutch operable to rotate said drive member in one direction from said driven member and permitting overrun of said drive member in the same direction, said one direction corresponding to direction of rotation of said drive member as would attend forward drive of said driven member.

EVERETT R. BURTNETT.